United States Patent [19]
Berkhoudt

[11] 3,759,241
[45] Sept. 18, 1973

[54] OVEN
[75] Inventor: Paul G. C. A. Berkhoudt, Jutphaas, Netherlands
[73] Assignee: Koninklijke Fabriek Inventum N.V., Bilthoven, Netherlands
[22] Filed: Mar. 6, 1972
[21] Appl. No.: 231,886

[30] Foreign Application Priority Data
Dec. 16, 1971 Netherlands ............... 7117236

[52] U.S. Cl. .......................... 126/21 A, 219/400
[51] Int. Cl. ...................... A21b 1/26, F24c 15/32
[58] Field of Search ............... 126/21 A; 219/400

[56] References Cited
UNITED STATES PATENTS
| | | | |
|---|---|---|---|
| 2,906,620 | 9/1959 | Juhg | 126/21 A |
| 3,118,436 | 10/1964 | Keating | 126/21 A |
| 2,491,420 | 12/1949 | Scott | 126/21 A |
| 3,439,665 | 4/1969 | Stromquist | 126/21 A |

Primary Examiner—Edward G. Favors
Attorney—I. Irving Silverman et al.

[57] ABSTRACT

The oven is adapted to uniformly and rapidly heat foodstuffs carried therein and is particularly useful in aircraft. The oven includes a housing having side walls, a top wall, and a bottom wall. An open space is defined between the top and bottom walls. Heating members for heating air within the oven are located therein together with a blower for circulating the heated air within the oven. A perforated rear plate is located within the oven and a plurality of foodstuff-receiving plates are arranged one above the other within the open space. Hot air is supplied to the space through open sides and an open front of the space and is conducted away from the space through the perforated rear wall.

7 Claims, 6 Drawing Figures

3,759,241

OVEN

BACKGROUND AND SUMMARY OF THE INVENTION

The invention relates to an oven which is adapted to rapidly heat foodstuffs, such as meals, and which includes a fan for circulating air and heating members for heating the air. Known ovens of this type have the disadvantage that the foodstuffs are not uniformly heated at all places in the oven, so that comparatively high temperature differences occur between foodstuffs arranged at different areas and level in the oven.

The invention has for its object to provide an oven of the type referred to above having a simple construction and providing, nevertheless, a satisfactory circulation of air so that, at any area or level in the oven provided with food-stuff, an at least substantially uniform temperature is attained.

According to the invention, the aforementioned object is achieved by providing an oven with a plurality of foodstuff-receiving plates located one above the other, with the plates being arranged in a space closed on the top and bottom sides by an upper wall and a bottom wall respectively, and with the hot air being supplied through an open sides of the space and being conducted away from the space through a perforated rear wall.

DESCRIPTION OF THE PREFERRED EMBODIMENT

Figure 1:
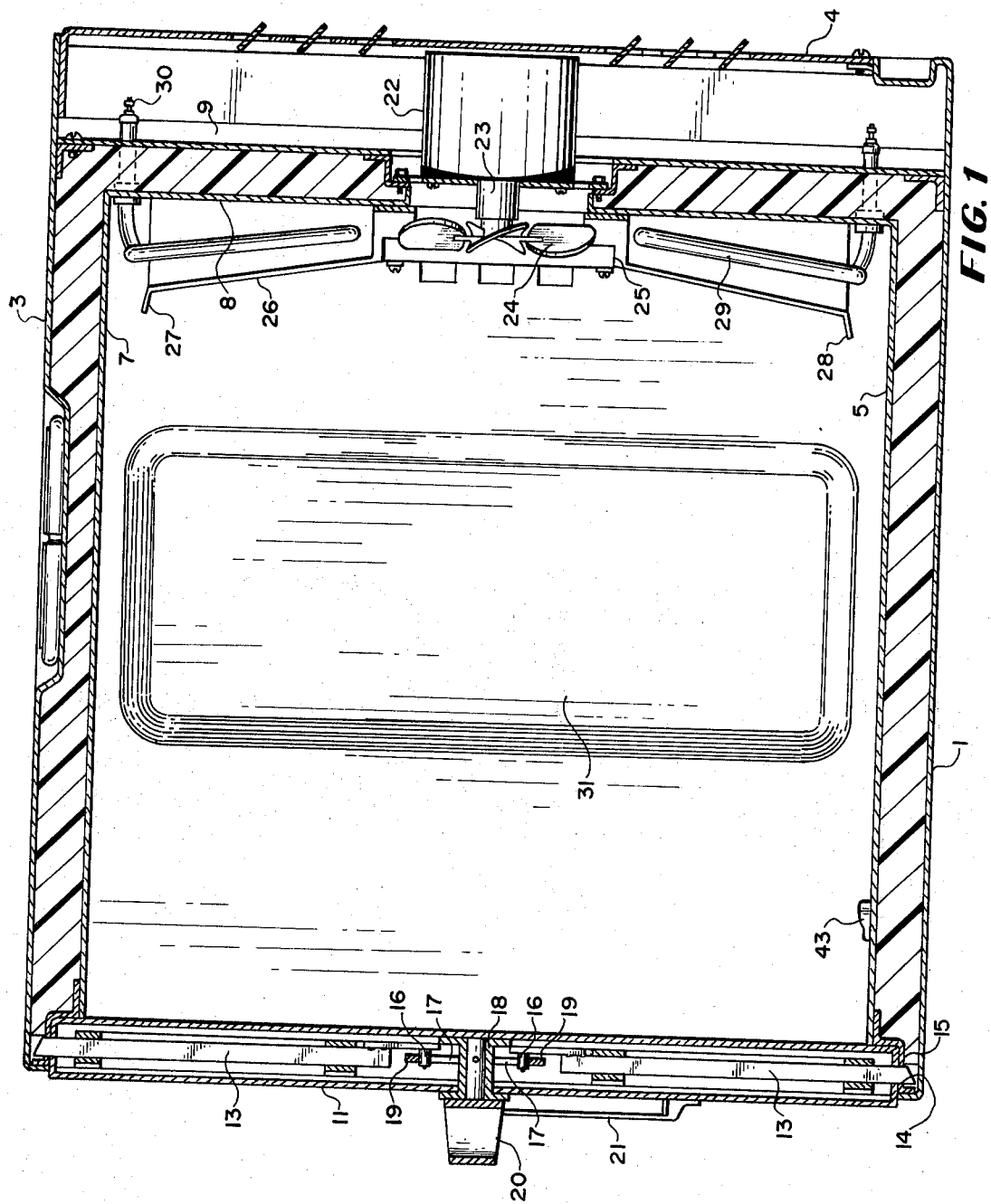
FIG. 1 is a sectional view of an oven embodying the invention.

The oven shown in the Figures comprises an outer casing comprising a bottom wall 1, side walls 2, an upper wall 3, and a rear wall 4. The rear wall 4 is connected with a further part of the outer casing so as to be readily detachable. The oven further comprises an inner casing formed by a bottom wall 5, side walls 6, an upper wall 7 and a rear wall 8. Between the rear wall 8 of the inner casing and the rear wall 4 of the outer casing a readily removable partition 9 is arranged. The spaces between the bottom walls, upper walls and side walls of the inner and outer casings and the space between the rear wall of the inner casing and the partition 9 are filled with insulating material. It is preferred to use a mixture of about 51 percent by weight of aluminum trioxide and 49 percent by weight of silica with a binder, preferably a phenolic resin. It has been found that a comparatively thin layer of this material provides a particularly satisfactory insulation.

At the front the oven is closed by a double door 11 hinged to the outer casing of the oven by means of a piano hinge 12. Near the side of the door 11 remote from the hinge 12, longitudinally slidable bars 13 are arranged in the double door 11. The ends of the bars 13 are located in the manner shown in FIG. 1, when the door 11 is closed, in holes or openings 14 in frames 15 surrounding a major part of the door 11. The inner ends of the bars 13 are provided with rollers 16, located in recesses 17 in plates 19, which are secured to a hub 18. The hub 18 is secured to a shaft which is connected to a handle 20 at the front of the door. One end of the handle 20 is located in a guide gutter 21, which is located radially outwardly of the axis of the shaft, the ends of the gutter 21 forming stops for limiting the angle of rotation of the handle 20. The recesses 17 are shaped so that, when the handle 20 is turned downwardly out of the position shown in the Figures from one end of the guide 21 to the other end thereof, the free ends of the bars 13 are withdrawn from the holes 14, after which the door 11 can be opened.

An electric motor 22 is fastened to the readily detachable partition 9. A blower 24 is secured to the inner end of a shaft 23 of the motor 22. The blower 24 is partly surrounded by a ring 25, which forms the boundary of an opening in a plate 26. From the top side of the ring 25 the plate 26 is inclined upwardly towards the front of the oven and in a similar manner the plate 26 is inclined from the lower side of the ring 25 downwardly towards the front of the oven. The lower and upper edges 27 and 28 of the plate are bent over through a comparatively large angle to the front. The portions of the plate 26 inclined upwardly and downwardly away from the ring are at an angle of about 10° to the perpendicular, whereas the bent-over edges 27 and 28 are at an angle of about 20° to the horizontal.

The soace or channels between the plate 26 and the rear wall 8 accommodates solid rod heating elements 29. The rod elements 29 are connected to the terminals 30 located between the rear wall 4 and the partition 9.

Figure 2:
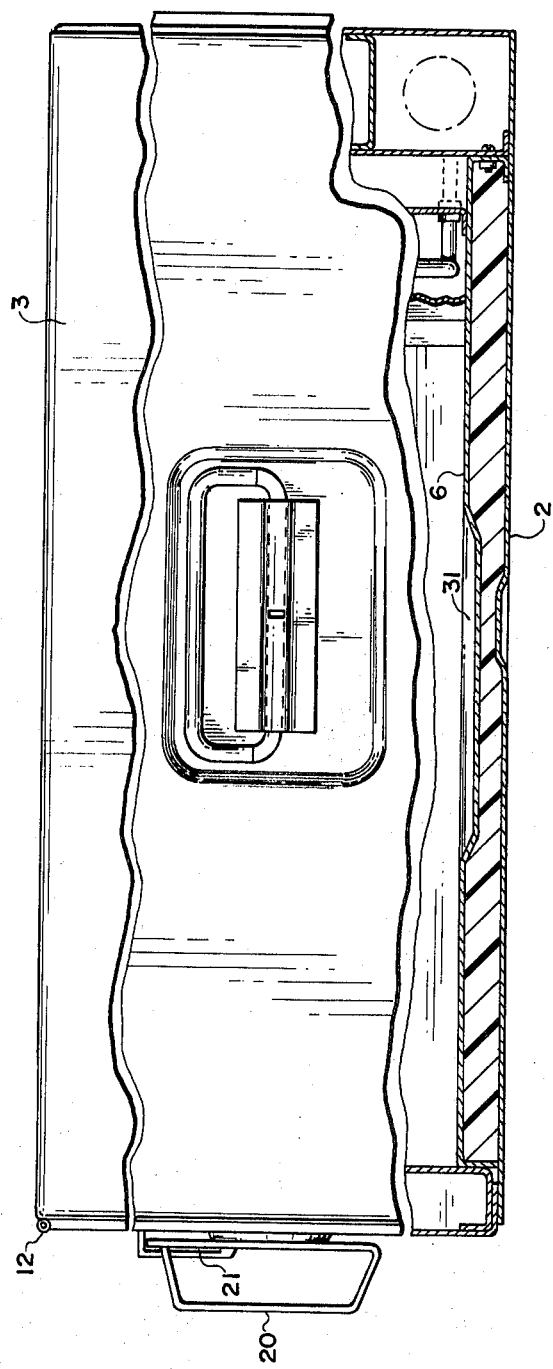
FIG. 2 shows the oven of FIG. 1 partly in a sectional view and partly in a plan view.

From FIGS. 1 and 2 it will furthermore be apparent that near the center of the oven the side walls have depressions 31, the width of each being approximately equal to one-third of the distance between the front side of the oven and the plate 26. The depressions 31 extend substantially throughout the height of the oven.

Figure 3:
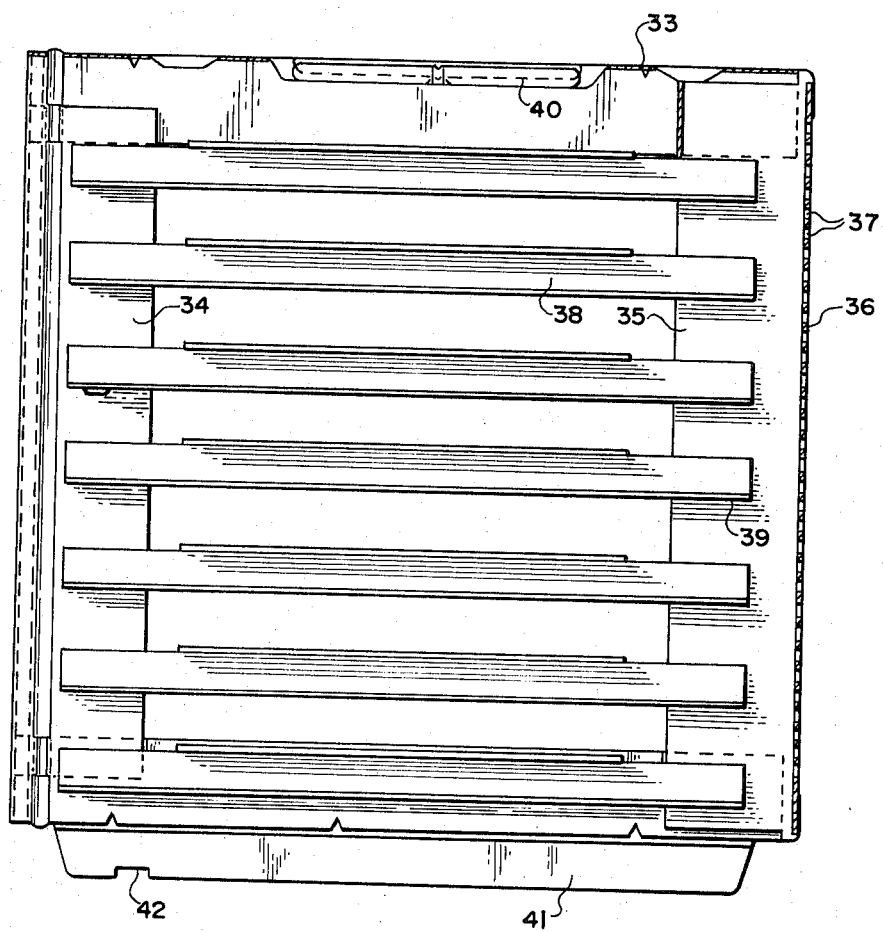
FIG. 3 is a sectional view of a separate holder to be arranged in the oven.
Figure 4:
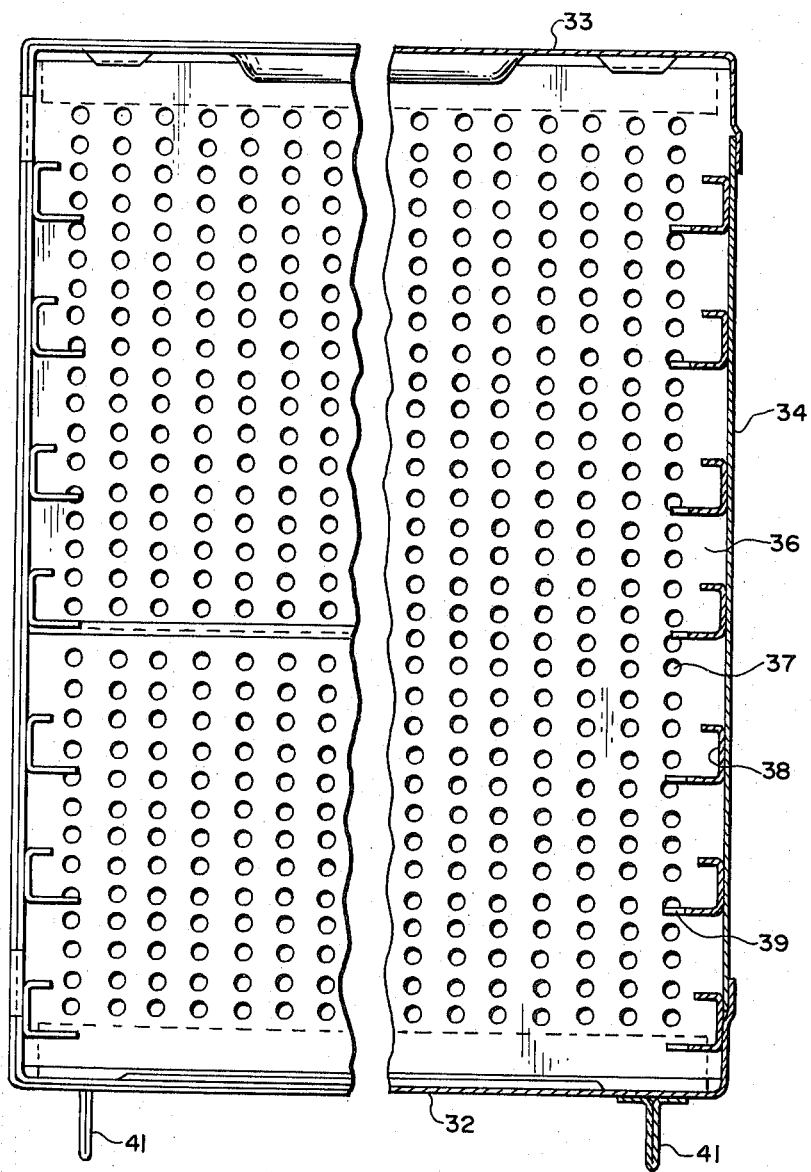
FIG. 4 shows the holder of FIG. 3 partly in an elevational view and partly in a sectional view.

The holder shown in FIGS. 3 and 4 can be arranged in the oven. This holder comprises a lower wall 32 and an upper wall 33, the upwardly and downwardly bent-over side walls being interconnected with the aid of strips 34 located near the front of the holder. Near the rear side of the holder the lower and upper walls are interconnected with the aid of the bent-over end 35 of a rear wall 36. The rear wall 36 is formed by a perforated plate having a large number, a plurality, of holes 37. Between the strips 34 and the bent-over sides of the rear wall 36, supports 38 extend parallel to the lower wall. From FIGS. 4 and 5 it will be apparent that the supports 38 have a channel-section profile over the major part of their length, whereas the ends of the supports 38 have the shape of an L because the upper limb of the channel-section profile does not extend over the entire length of the support. The upper limb of the channel-section profile is narrower than the lower limb thereof. At a given area, the lower limb of the channel-section profile has a recess 39 for a purpose to be described hereinafter.

A dished portion of the upper wall is provided with a pivotable handle 40 for facilitating manipulation of the holder. To the lower side of the bottom plate are fastened vertical fillets or supporting limbs 41 extending in the direction of length of the holder and provided near the front with rectangular recesses 42. The holder described above can be slipped into the oven. When it is arranged in the oven, the holder is secured against sliding out by cams 43 projecting from the lower plate 5 falling into the recesses 42. In order to facilitate the insertion of the holder into the oven the top sides of the cams are bevelled upwardly and rearwardly, as will be seen from FIG. 1.

Figure 5:
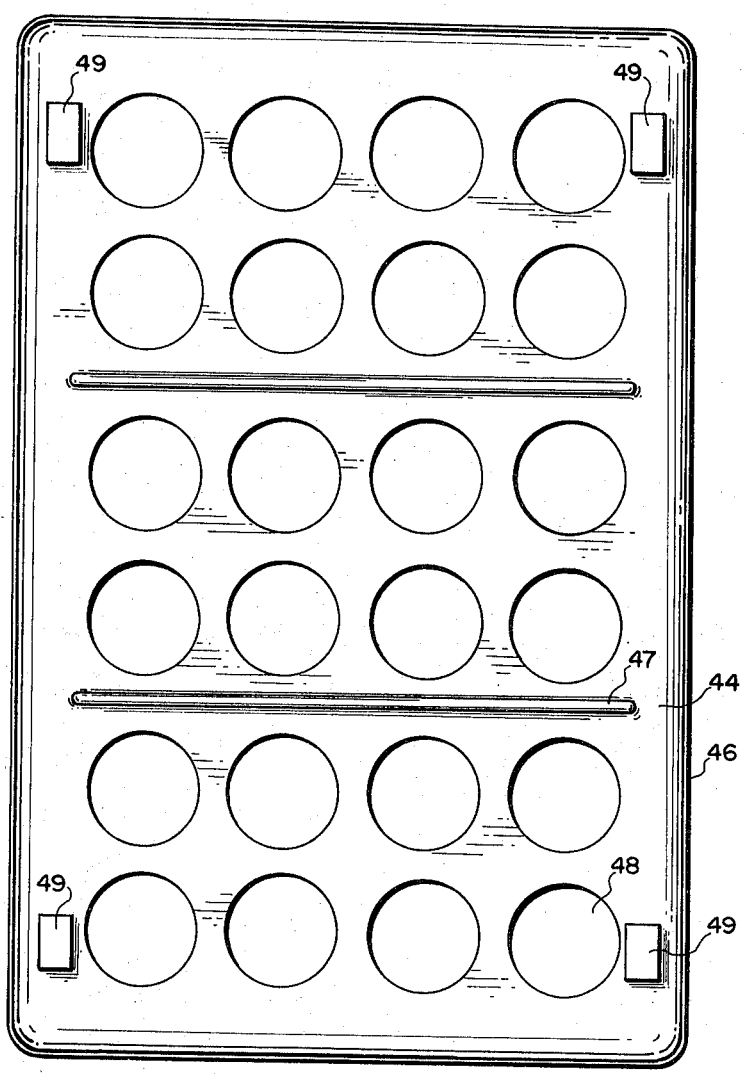
FIG. 5 is a plan view of a plate adapted to be inserted into the holder.
Figure 6:
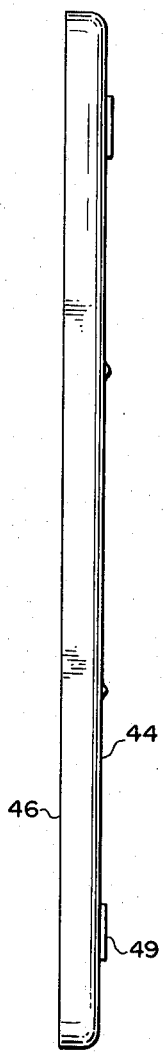
FIG. 6 is a sectional view of the plate of FIG. 5.

A plate 44, shown in FIG. 5 and 6, can be disposed on each set of opposite supports 38, It will be seen from FIGS. 5 and 6 that the plate 44 has an upright side wall 46 surrounding the plate throughout its periphery. The plate is stiffened by a few depressed ridges 47. The plate has a plurality of holes 48 of comparatively large diameter. At four areas square plates 49 are welded to the lower side of the plate. When the plate 44 is slid across the lower limbs of the supports, the plates 49 will snap into the recesses 39 so that the plates 49 and the recesses 39 form relatively cooperating stops for preventing the plate from being displaced with respect to the supports.

The oven described above is particularly suitable for use in aircraft. In this respect, prepared ready meals can be rapidly heated in the oven to facilitate the serving of the meals to aircraft passengers. Because the holder is prevented from displacing itself with respect to the oven by the relatively cooperating cams 43 and the recesses 42 and the plates are prevented from being displaced with respect to the holder by the relatively cooperating plates 49 and the recesses 39, the holder and/or the plates are prevented from sliding out of the oven such as when the door is open, when the aircraft is in an inclined position, and/or when the aircraft accelerates or decelerates.

When the holder is arranged in the oven, the rear wall of the oven is located on the plate 26 in between the bent-over edges 27 and 28. In order to heat up the contents of the oven, the solid rod heating elements 29 are heated and the blower 24 is actuated. The blower 24 draws air from the interior of the oven through the perforated plate 36 and the space between the plate 36 and the plate 26. The blower 24 pushes the air upwards and downwards through the heating channels between plate 26 and wall 8 such that the air flows back between the upper wall 7 and the bent-over edge 27 of plate 26 and between the lower wall 5 and the bent-over edge 28 of plate 26. Subsequently, the heated air is evenly distributed in the space of the oven, the circulation of the air being also affected by the depressions 31 in the side walls. Since comparatively large holes 48 are provided in the plate 44, foodstuff disposed on the plates will be heated by the passing air both on the top side and the bottom side.

It has been found that by means of the design described and particularly by using the perforated plate 36 through which air is sucked out of the space of the oven, such a circulation of the hot air is produced that temperature differences inside the oven are negligible so that any meal at any area or level in the oven is invariably heated at a uniform temperature.

I claim:

1. An oven for rapidly and uniformly heating foodstuffs, said oven comprising a housing having inner side walls, an inner rear wall, an inner top wall and an inner bottom wall, an open space defined in between said top and bottom walls, a plate near the rear wall extending upwardly and downwardly in inclined positions from the bottom and top wall respectively towards said rear wall, the center of said plate having a suction hole for a blower for circulating air within said oven, said blower being mounted between said plate and the rear wall, heating elements being arranged between said plate and said rear wall, the air being pushed along said heating elements by said blower for heating the air, a holder being arranged detachably in said open space, said holder having open sides, an open front, a perforated flat rear wall, abutting against the upper and lower parts of said plate and supporting means for supporting a plurality of foodstuff receiving plates arranged one above the other within said space, the heated air being supplied to said open space via slits between the edges of said plate and the top and bottom walls and being conducted via the open sides and front of the holder and away from said space through said perforated rear wall having a plurality of small openings.

2. The oven as claimed in claim 1, wherein said foodstuff receiving plates and said holders are provided with cooperating stops for preventing said foodstuff receiving plates from being displaced with respect to said holder.

3. The oven as claimed in claim 1, wherein said inner side walls of said oven have depressed portions located intermediate the front and rear of said oven, the width of said depressions being at least substantially equal to one-third of the length of said oven, and the height of said depressions being at least substantially equal to the entire height of the oven.

4. The oven as claimed in claim 1, wherein said foodstuff receiving plates are provided with holes.

5. An oven for rapidly and uniformly heating foodstuffs, said oven comprising a housing having inner side walls, an inner rear wall, an inner top wall and an inner bottom wall, an open space defined in between said top and bottom walls, a plate near the rear wall extending upwardly and downwardly in inclined positions from the bottom and top wall respectively towards said rear wall, the center of said plate having a suction hole for a blower for circulating air within said oven, said blower being mounted between said plate and the rear wall, heating elements being arranged between said plate and said rear wall, the air being pushed along said heating elements by said blower for heating the air, a flat vertically extending perforated plate having a plurality of small openings abutting against the upper and lower parts of said plate, said inner walls having depressed portions located intermediate the front and rear of said oven, the width of each of said depressions being a least substantially equal to one-third of the length of said oven and the height of said depressions being at least substantially equal to the entire height of said oven, and a plurality of foodstuff receiving plates detachably arranged one above the other within said space, the heated air being supplied to said open space via slits between the edges of said plates and the top and bottom walls and being conducted through open sides and an open front between the foodstuff receiving plates and away from said space through said perforated rear wall.

6. The oven as claimed in claim 5, wherein said foodstuff receiving plates are arranged in a holder detachably arranged in said oven, the sides and the front of said holder being open, said foodstuff receiving plates and said holders being provided with cooperating stops for preventing said footstuff receiving plates from being displaced with respect to said holder and said oven having stops therein for preventing said holder from sliding within said oven.

7. The oven as claimed in claim 5, wherein said foodstuff receiving plates are provided with holes.

* * * * *